United States Patent [19]
Purdy

[11] 3,914,939
[45] Oct. 28, 1975

[54] PRESSURE COMPENSATED PUMP

[75] Inventor: Paul J. Purdy, Eldridge, Iowa

[73] Assignee: J. I. Case Company, Racine, Wis.

[22] Filed: Oct. 7, 1974

[21] Appl. No.: 512,383

Related U.S. Application Data

[62] Division of Ser. No. 378,358, July 11, 1973, Pat. No. 3,863,448.

[52] U.S. Cl. ............... 60/422; 60/445; 60/450; 60/484
[51] Int. Cl.² ............... F16H 39/46; F15B 11/16
[58] Field of Search ............ 60/422, 443, 445, 484, 60/494, 450

[56] References Cited
UNITED STATES PATENTS

| | | | |
|---|---|---|---|
| 2,892,311 | 6/1959 | Van Gerpen | 60/422 |
| 3,465,519 | 9/1969 | McAlvay et al. | 60/450 X |
| 3,777,492 | 12/1973 | Boydell et al. | 60/445 X |

*Primary Examiner*—Edgar W. Geoghegan
*Attorney, Agent, or Firm*—Cullen, Settle, Sloman & Cantor

[57] ABSTRACT

A control circuit for regulating the output of a variable displacement pump in response to the total demand called for by a plurality of manually operable fluid motor control valves. Each motor control valve has an associated flow control valve connected in series with it. The flow control valves are connected in series with each other, each dividing the flow which it receives between its associated motor control valve and the next downstream flow control valve. The flow division at each flow control valve is responsive to the demand and flow rate across its associated motor control valve, with each flow control valve reducing the flow apportioned to the next downstream flow control valve when its associated motor control valve demands a greater flow than it is receiving. The flow rate diverted by the last of the flow control valves away from its associated motor control valve is thus inversely proportional to the total demand of all the motor control valves, and is sensed by an orifice which produces a signal to increase pump displacement from its normal minimum condition when the total demand exceeds the pump output.

6 Claims, 2 Drawing Figures

PRESSURE COMPENSATED PUMP

This application is a divisional application of my co-pending application for U.S. Pat., Ser. No. 378,358, filed July 11, 1973, now U.S. Pat. No. 3,863,448.

BACKGROUND OF INVENTION

It is often desirable in hydraulically operated apparatus to utilize a variable displacement pump in conjunction with automatic displacement-controlling means so that the output of the pump can be maintained at a minimum except when further output is demanded by the system. The advantages of a system so equipped include reduction in horsepower required to operate the circuit, reduction in heat rise of the fluid when operating in a neutral or low demand condition, possible elimination or reduction in capacity of an oil cooler, and reduction in pump and relief valve noise in low demand conditions.

Furthermore, occasions sometimes arise in systems having several fluid motors receiving the output of the pump that the total demand of the system may exceed the capacity of the pump. In such a situation, it may be desirable to provide means for establishing a priority among the various fluid motors, to assure that high priority motors receive the full fluid flow demanded, even if at the expense of the supply to the other fluid motors. One type of equipment that might require such features would be earth moving equipment, such as a bulldozer or a backhoe having multiple independently controlled fluid motors for angling, lifting or otherwise positioning the implement.

Circuits having the displacement controlling feature and the priority establishing feature are known in the art. An example of such a circuit is disclosed in U.S. Pat. No. 2,892,311 of June 30, 1959. One disadvantage of the system disclosed in Van Gerpen is that it is incapable of summing the combined fluid demand for the several fluid motors, it being only capable of sensing the demand in the one motor calling for the greatest quantity of fluid.

Accordingly, it is the principle object of this invention to provide an improved circuit for controlling the output of the variable displacement pump, which control continuously senses and responds to the combined demand of all fluid motors in the system, while simultaneously providing a predetermined priority among the various fluid motors if the total demand exceeds the output of the pump at any given time.

This and other objects of the present invention will become further apparent from the following specification, of which the following drawings form a part.

DETAILED DESCRIPTION OF THE INVENTION

Figure 1:
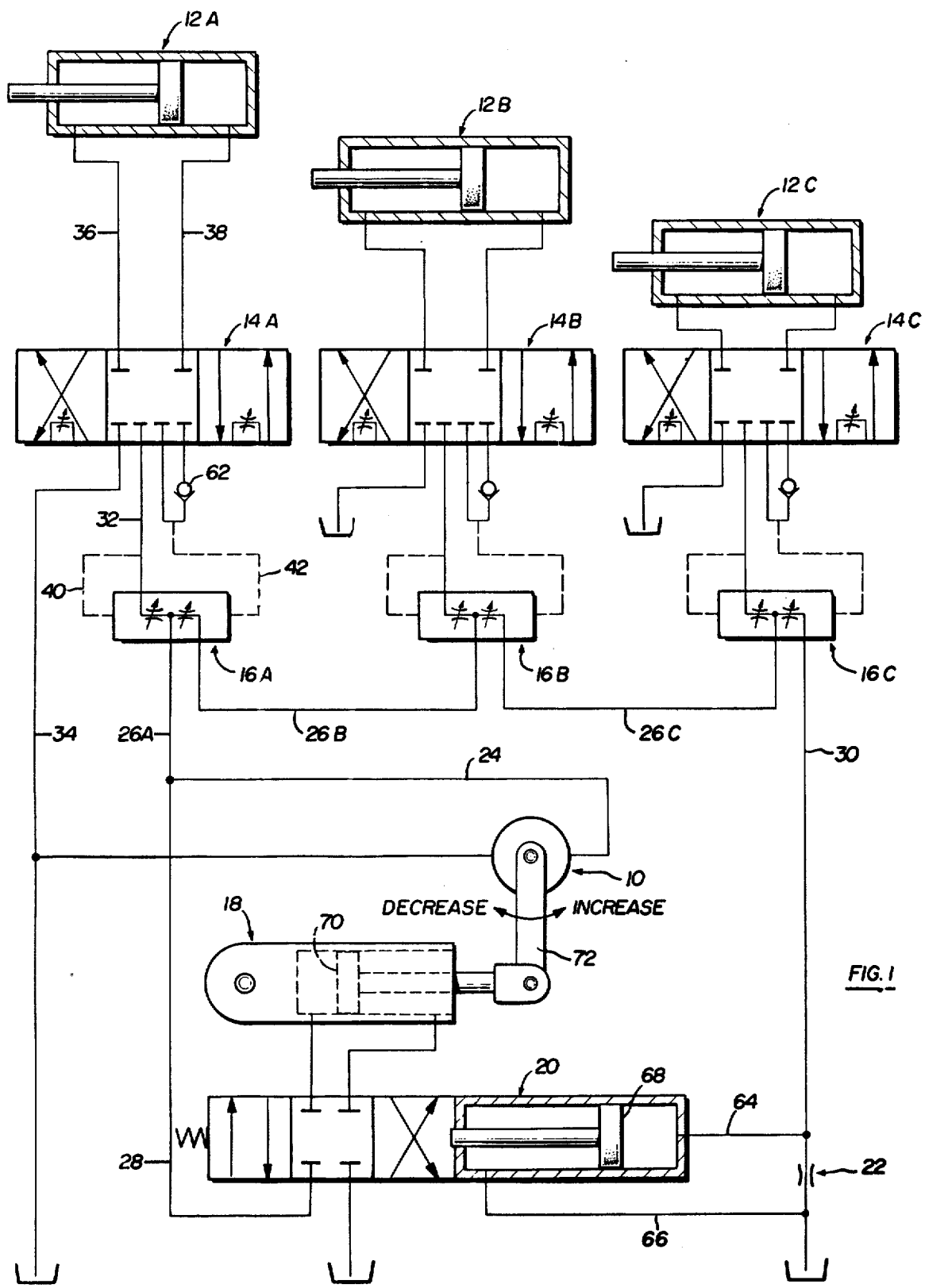
FIG. 1 schematically illustrates a preferred hydraulic circuit incorporating the present invention.

Referring in particular to FIG. 1 of the drawings, the improved pump control circuit of this invention generally comprises a variable displacement pump 10, which may be of the swash plate type, three double-acting hydraulic motors 12a, 12b and 12c, each having an associated manual control valve 14a, 14b and 14c, and an associated flow control valve 16a, 16b and 16c, respectively.

The displacement of the pump is under the control of a doubleacting pump regulating motor 18, pump demand valve 20 and demand sensing orifice 22.

Pump output line 24 branches to supply the series connected flow control valves 16a, 16b and 16c by series-connected supply lines 26a, 26b and 26c, respectively. Another branch 28 of pump output line 24 supplies fluid to pump demand valve 20. A return line 30 carries fluid from flow control valve 16c to exhaust, after passing through demand sensing orifice 22.

Each of the flow control valves 16a, 16b and 16c are identical, as are each of the manual control valves 14a, 14b and 14c. Accordingly, only the structure, function and interaction of hydraulic motor 12a, manual control valve 14a and flow control valve 16a need be described, it being understood that the correspondingly numbered elements have identical construction and operation.

Figure 2:
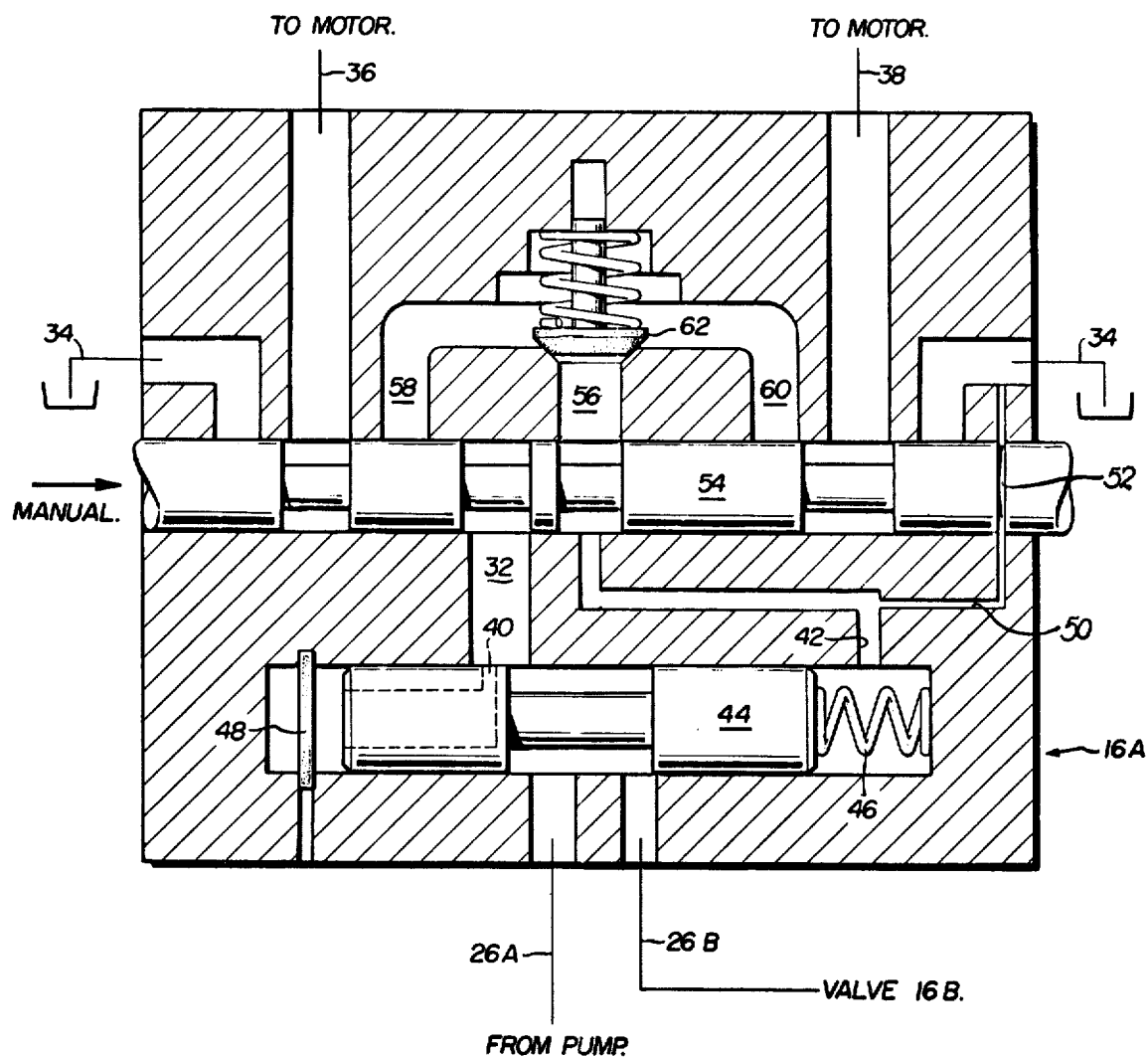
FIG. 2 is a cross-section through a typical manual control valve and flow control valve associated with one of the fluid motors of FIG. 1.

Referring now to both FIGS. 1 and FIG. 2, flow control valve 16a continually meters and apportions the fluid from supply line 26a to motor supply line 32 and supply line 26b for the downstream flow control valve 16b. Manual control valve 14a is a conventional four-way valve which controls fluid flow between supply line 32, motor exhaust line 34 and the two motor lines 36, 38.

Feedback signals lines 40 and 42 act upon the opposite ends of spool 44 of flow control valve 16a, and function along with spring 46 to control the setting of that valve in response to the setting of and flow through manual control valve 14a, as will be described below. A stop 48 limits the leftward stroke of spool 44, so that the chamber at the left end of spool 44 is always in communication with line 32 via line 40. When spool 54 is in its illustrated neutral position, fluid displaced from the chamber at the right end of spool 44 by a rightward stroke of spool 44 can bleed off to exhaust 34 via restricted line 50 and annular groove 52 of spool 54.

Four-way manual control valve 14a has a spool 54 which controls ports 56, 58 and 60. In the neutral position shown in FIG. 2, spool 54 blocks flow from motor supply line 32 through port 56, so that no pressurizing fluid is applied to either motor line 36 or 38. When spool 54 is moved to the right, communication is established across it between motor supply line 32 and port 56, and the pressure in such line is sufficient to open load check valve 62. Fluid continues to flow from there through port 58, past spool 54 and out through motor line 36 to the left chamber of hydraulic motor 12a. Thus, rightward movement of spool 54 of manual control valve 14a causes the rod of hydraulic motor 12a to retract, while the righthand chamber of motor 12a exhausts via motor line 38, spool 54 and exhaust line 34.

Similarly, if spool 54 is shifted to the left, flow is again established from motor supply line 32 through port 56 and load check valve 62, but this time it continues through port 60 to motor line 38 to pressurize the righthand chamber of hydraulic motor 12a, causing extension of the rod of that motor. The lefthand motor chamber is then exhausted via line 36, spool 54 and exhaust line 34. The function of load check valve 62 is to prevent reverse flow or loss of fluid pressurization in hydraulic motor 12a if the load exceeds the pressure of the incoming fluid from motor supply line 32 and port 56.

The fluid diverted from supply line 26a to supply line 26b by flow control valve 16a then enters flow control valve 16b, in the same fashion as supply line 26a enters flow control valve 16a. There, it is identically apportioned between the motor supply line leading from flow control valve 16b to manual control valve 14b and supply line 26c leading to flow control valve 16c. Similarly, flow control valve 16c apportions the incoming fluid from line 26c between its associated manual control valve 14c and supply return line 30 leading to demand sensing orifice 22 and exhaust.

Orifice 22, as will be further explained below, senses the demand of the system by sensing the flow rate through it. Upstream and downstream pilot signal lines 64, 66, respectively, carry the pressure signals from the respective sides of orifice 22 to the right and left chambers associated with demand valve piston 68 of demand valve 20. The position of piston 68, along with associated biasing springs, controls the setting of the conventional four-way pump demand valve 20 to supply fluid to pump regulating motor 18, where the position of regulating cylinder piston 70 controls the setting of swash plate arm 72. In this fashion, pressure drop across orifice 22 controls the displacement of pump 10, as will now be further explained.

OPERATION

Assume that all manual control valve 14a, 14b and 14c are in the neutral position shown in FIG. 2, so that no fluid is supplied to any of the associated hydraulic motors 12a, 12b or 12c. In this condition, spool 44 of flow control valve 16a will also be in the position shown in FIG. 2, wherein communication is established between supply line 26a and motor supply line 32, as well as between supply lines 26a and 26b. However, because motor control valve 14a is in its neutral position, there will be no actual flow through line 32. The pressure in line 32 will be transmitted through feedback signal line 40 and the passage within spool 44 to the chamber at the left end of spool 44 and will produce a pressure in opposition to spring 46 to assure that flow will occur from supply line 26a to suppply line 26b.

In this illustrated condition, with no flow across spool 54 to port 56 or to feedback signal line 42, there will be a relatively high flow rate into line 26b, since none of the flow from 26a will be diverted to line 32.

Similarly, since motor control valves 14b and 14c are also in their neutral positions, the spools of flow control valve 16b and 16c will be in the same relative position as spool 44 of flow control valve 16a. Therefore, the flow in line 26b will continue downstream through valves 16b and 16c to line 30 and demand sensing orifice 22, without reduction in volume.

Accordingly, the illustrated zero demand condition corresponds with a high flow rate through demand sensing orifice 22. This high flow rate will create a high pressure differential in pilot signal lines 64 and 66, causing piston 68 of pump demand valve 20 to stroke to the left, which in turn will cause fluid to be supplied from line 28 to the righthand chamber of pump regulating motor 18. The resulting retraction of the rod of that motor will pivot swash plate arm 72 in a pump output reducing direction, appropriate for this minimum demand condition. In such condition, the output of the pump may, for example, be ½ to 1 gallon per minute in a pump having a capacity of 50 to 100 gallons per minute. This flow rate is sufficient to assure operation of the pump output regulating circuit.

When manual control valve 14a is shifted either to the left or right to produce extension or retraction of the rod of hydraulic motor 12a, the fluid already available in line 32 will begin to flow across spool 54 to port 56 and on to the appropriate motor line 36 or 38. A portion of that flow will also be diverted in the form of a pressure signal to feedback signal line 42 to oppose the signal already present in feedback signal line 40.

Instantaneously with the opening of manual control valve 14a, there will be a drop in pressure in line 32 and feedback signal line 40, accompanied by a rise in pressure in feedback signal line 42. This change in opposing pressures will cause spool 44 of flow control valve 16a to shift to the left, to substantially reduce or cut off any output flow into supply line 26b, thereby diverting most or all of the flow from input supply line 26a to motor supply line 32, where the demand has been indicated to be. The drop in flow from flow control valve 16a into line 26b will necessarily be reflected in a drop in flow through return line 30 and demand sensing orifice 22. The resulting reduction in pressure drop across orifice 22 will shift piston 68 and pump demand valve 20 back toward the right, which will in turn direct fluid from line 28 to the left side of pump regulating motor 18 to start increasing the output of pump 10 to meet the new demand called for by manual control valve 14a. As the output of pump 10 increases to meet this demand, the for rate through line 26a, across spool 44, through line 32, and across spool 54 to port 56 will increase. The increasing flow rate across spool 54 will cause a correspondingly increased pressure drop thereacross, which pressure drop will be reflected by an increasing difference in the pilot pressures applied to the opposite ends of spool 44. The increasing difference will act to oppose spring 46, to gradually shift spool 44 back to the right, thus redistributing the flow from line 26a so that less goes to line 32 and more is diverted downstream to line 26b. The resulting increase in flow to lines 26b, 26c and 30 will start increasing the pressure drop across demand sensing orifice 22. This in turn will cause a leftward stroke of piston 68, to reduce the fluid flow to the left chamber of pump regulating motor 18 to stop the stroke thereof and to signal pump 10 to maintain its existing output rate in view of the satisfied demand at hydraulic motor 12a.

When motor 12a has completed its stroke, the termination of flow across spool 54 will restore spool 44 to its zero demand condition. This in turn will maximize the flow rate through orifice 22, and cause piston 68 to stroke all the way to the left to again bring the pump output down to its minimum level.

Thus it is evident from the foregoing explanation that demand sensing orifice 22 is supplied with fluid in line 30 whose flow rate is inversely proportional to the demand called for by manual control valve 14a. That is, when valve 14a is in its neutral position, or when the flow rate which it calls for is satisfied by the pump, there will be a relatively high rate of flow in line 30, whereas an unsatisfied demand will mean that the flow control valve 16a will have sharply reduced or cut off the flow rate into line 30.

The relationship of flow control valves 16a, 16b and 16c in series establishes a priority sequence among hydraulic motors 12a, 12b and 12c. For example, since flow control valve 16b is supplied with fluid from line 26b only when there is no substantial demand for fluid called for by manual control valve 14a, a simultaneous demand for fluid by both manual control valves 14a and 14b will result in most if not all of the output of pump 10 being directed to motor 12a, at the expense of motor 12b. Only as the demand at motor 12a becomes satisfied, as reflected by the increased flow rate across spool 54, will flow control valve 16b and its associated manual control valve 14b being to receive any substantial quantity of fluid. The same priority relationship necessarily also exists as to the furthermost downstream flow control valve 16c. The system of the present invention accordingly establishes a priority sequence which favors each upstream flow control valve relative to the next downstream flow control valve.

The system of the present invention is capable of continuously sensing the total unsatisfied demand for fluid. Thus, if motor control valves 14a and 14b and/or 14c are all set to positions calling for less than maximum flow to each of their respective motors, demand sensing orifice 22 will sum these demands. This occurs because each of the flow control valves in question will divert a portion of the pump output to its associated manual control valve, thus decreasing the flow passed on to the next downstream flow control valve. Thus, the flow rate in line 30 is reduced identically whether all of the demand comes from one motor or whether the total demand is divided among the several motors.

The output of pump 10 will therefore be continuously responsive to the total demand of the circuit, while providing a slight additional flow to assure operation of all of the valves even when there is no demand.

As will be understood by those skilled in the art, pump demand valve 20 could alternatively be a spring loaded cylinder and a three-way pilot operated valve. Furthermore, various accessory valves can be readily incorporated with the present system, such as pressure relief valve, valves to limit the horsepower output of the pump so as to prevent stalling of the engine, and so forth.

In addition to the advantages described above, the pressure compensated flow control valves will give good metering characteristics and low spool efforts, possibly eliminating the need for powered spools in some circuits. Furthermore, in some circuits where it may be desirable to limit the maximum flow to a given section, this can be accomplished by limiting the spool travel of that section.

This invention may be further developed within the scope of the following claims. Accordingly, the above specification is to be interpreted as illustrative of only a single operative embodiment of this invention, rather than in a strictly limited sense.

I now claim:

1. In a hydraulic circuit having a variable displacement pump, a pump displacement controlling device, a hydraulic motor and a motor control valve for controlling the fluid flow to the motor, the improved pump control system comprising:

a flow control valve having an input line and first and second output lines, said input line being connected to the output of the pump, said first output line leading to said motor control valve and being continuously connected across said flow control valve to said input line, said second output line being connected to a flow demand-sensing device;

feedback signal means connected to said motor control valve and to said flow control valve and operable to sense the flow rate and flow demand through said motor control valve and to position said flow control valve to reduce flow from said input line to said second output line when the flow demanded by said motor control valve exceeds the flow rate therethrough, and to increase the flow from said input line to said second output line as the flow rate through the motor control valve catches up with the demand;

said flow demand sensing device being connected to the pump displacement controlling device and being responsive to the flow rate in said second output line to signal the pump displacement controlling device to control pump displacement in inverse proportion to the flow rate in said second output line.

2. The pump control system of claim 1 wherein the motor control valve includes a valve element controlling the communication between said first output line of said flow control valve and a fluid supply line leading to the hydraulic motor, said feedback signal means including first and second feedback lines, said first feedback line interconnecting the upstream side of said motor control valve element with a first portion of said flow control valve to bias said flow control valve in a direction to increase the portion of input line flow to said second output line and to decrease the portion to said first output line as the fluid pressure in said first feedback line increases, and said second feedback line interconnecting the downstream side of said motor control valve element with a second portion of said flow control valve to oppose the biasing tendency of said first feedback line as the fluid pressure in said second feedback line increases.

3. The pump control system of claim 1 wherein the pump displacement controlling device comprises a pump controlling hydraulic motor and a pump control valve having an input line supplied with fluid from the output of the pump and an output line connected to said pump controlling motor to control the action thereof;

said pump control valve being normally biased to a minimum pump displacement producing position when there is no demand for fluid from said first motor control valve, and said pump control valve being responsive to the output signal of said flow demand sensing device to shift said pump controlling motor toward an increased pump displacement producing position in proportion to decreasing flow rate in said second output line.

4. An improved hydraulic control system for controlling the output of a variable displacement pump comprising:

a pump controlling hydraulic motor for varying the displacement of the pump, a pump control valve having an input line supplied with fluid from the pump and an outlet line leading to said pump controlling motor to activate said motor to control the pump displacement according to the position of said pump control valve, said pump control valve being normally biased to a minimum pump displacement producing position;

a flow demand sensing device connected to said pump control valve and responsive to the fluid flow rate in a demand signal line flowing through said sensing device to cause said pump control valve to increase the pump displacement in response to decreasing flow rate in said demand signal line, whereby pump displacement is inversely proportional to the flow rate in said demand signal line;

a second hydraulic motor and a second motor control valve for controlling the flow of fluid thereto;

a flow control valve having an input line and first and second output lines, said input line being connected to the output line of the pump, said first output line continuously supplying fluid to said second motor control valve, and said second output line selectively supplying fluid to said demand signal line;

said second motor control valve including a valve element controlling the communication between said first output line of said flow control valve and said second motor;

feedback signal means interconnecting said flow control valve and said second motor control valve and operable to sense the flow rate demanded by said second motor control valve and to sense the flow rate across said valve element, and further operable to position said flow control valve to reduce flow from said input line to said second output line when the flow demanded by said second motor control valve exceeds the flow rate therethrough, and to increase flow from said input line to said second output line as the flow rate through said second motor control valve catches up with the demand.

5. In a hydraulic circuit having a variable displacement pump, a pump displacement controlling device for regulating the output of the pump, a hydraulic motor driven by said pump, a four-way motor control valve for controlling the fluid flow to the motor, and a flow control valve having an input line and first and second output lines, said input line being connected to an output of the pump, said first output line leading to said motor control valve, and said second output line being connected to a flow demand-sensing device, the improvement of:

feedback signal means connected to said motor control valve and to said flow control valve and operable (a) to sense the flow rate and flow demand through said motor control valve, (b) to position said flow control valve to reduce flow from said input line to said second output line when the flow demanded by said hydraulic motor exceeds the flow rate thereto, and (c) to increase the flow from said input line to said second output line as the flow rate through the motor control valve to the hydraulic motor catches up with the demand;

said flow demand sensing device being connected to the pump displacement controlling device and being responsive to the flow rate in said second output line to signal the pump displacement controlling device to control pump displacement in inverse proportion to the flow rate in said second output line.

6. An improved hydraulic control system for controlling the output of a variable displacement pump, comprising a pump controlling hydraulic motor including a piston reciprocable within a cylinder for varying the output of the pump, a pump control valve having an input line supplied with fluid from the pump and an outlet line leading to said pump controlling motor to reciprocate said motor piston to control the pump output according to the position of said pump control valve, a flow demand sensing device connected to said pump control valve and responsive to the fluid flow rate in a demand signal line flowing through said sensing device to cause said pump control valve to be activated for motor piston reciprocation to increase the pump displacement in response to decreasing flow rate in said demand signal line, whereby pump displacement is inversely proportional to the flow rate in said demand signal line, a second hydraulic motor and a second motor control valve for controlling the flow of fluid thereto, a flow control valve having an input line and first and second output lines, said input line being connected to the output line of the pump, the improvement of:

said second output line selectively supplying fluid to said demand signal line, said second motor control valve including a valve element controlling the communication between said first output line of said flow control valve and said second motor; and feedback signal means interconnecting said flow control valve and said second motor control valve (a) for sensing the flow rate demanded by said second hydraulic motor, (b) for sensing the flow rate across said motor control valve, (c) for positioning said flow control valve to reduce flow from said input line to said second output line when the flow demanded by said second hydraulic motor exceeds the flow rate thereto, and (d) for increasing flow from said input line to said second output line as the flow rate thruogh said second motor control valve catches up with the demand.

* * * * *